United States Patent Office 3,312,062
Patented Apr. 4, 1967

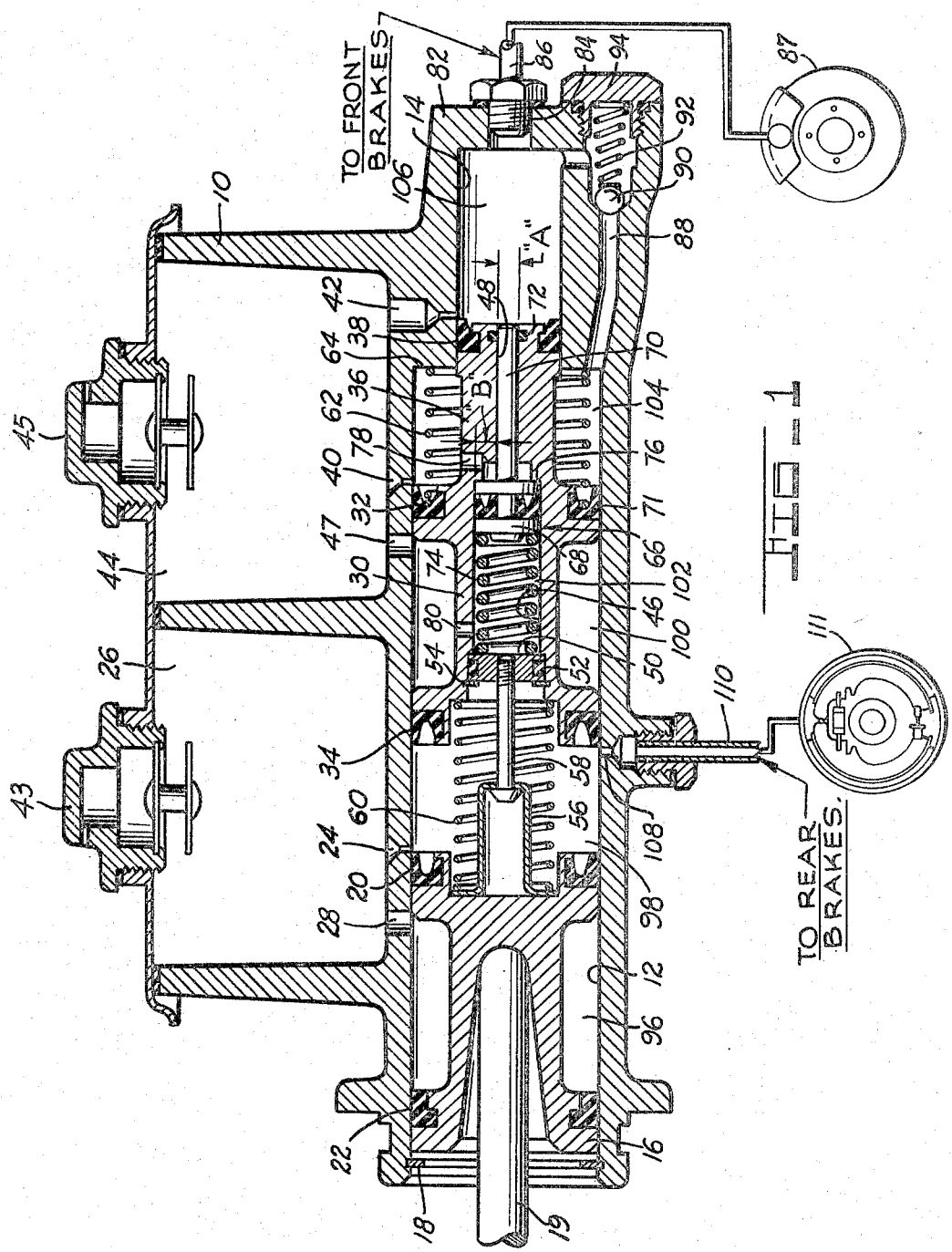

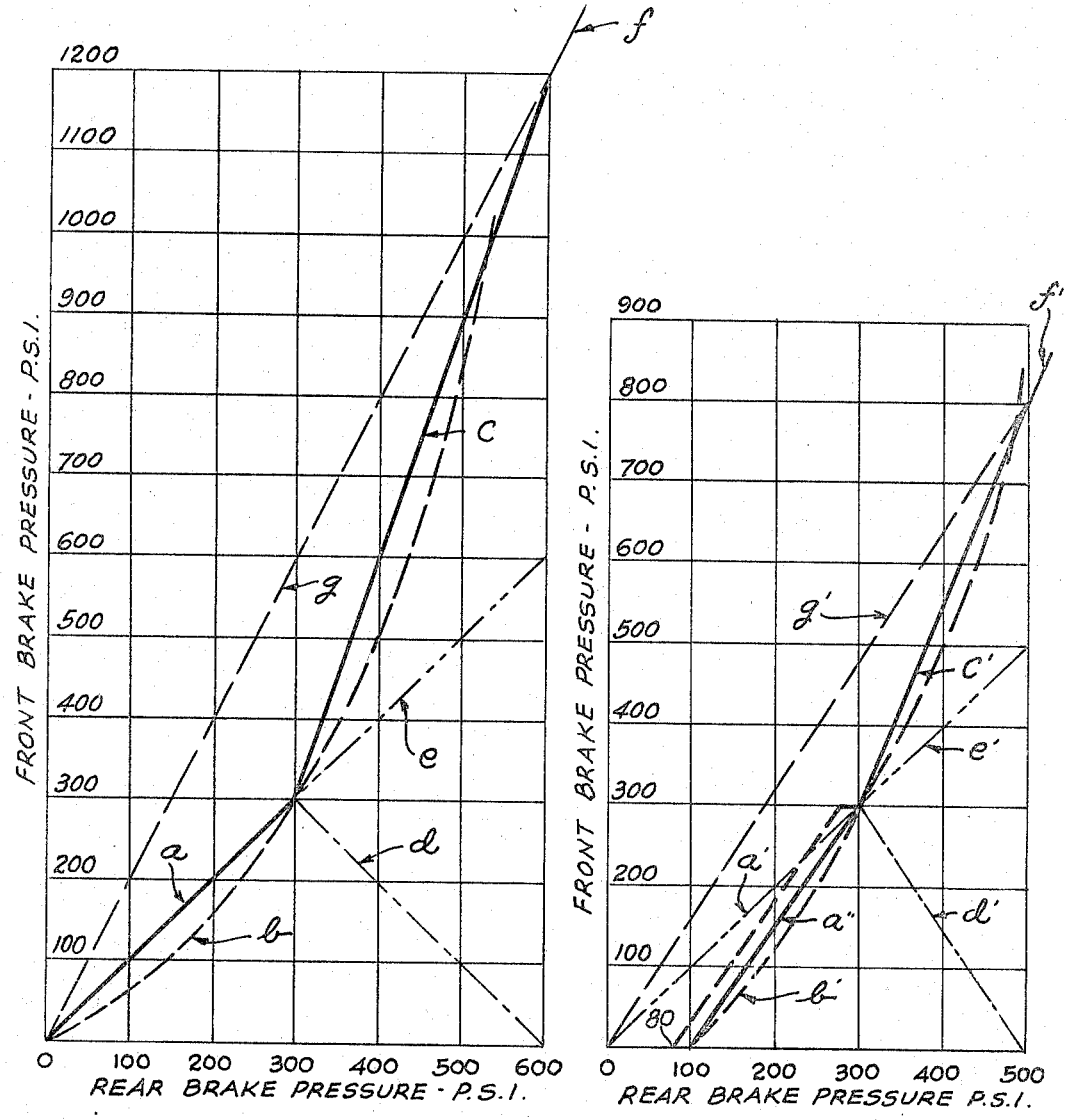

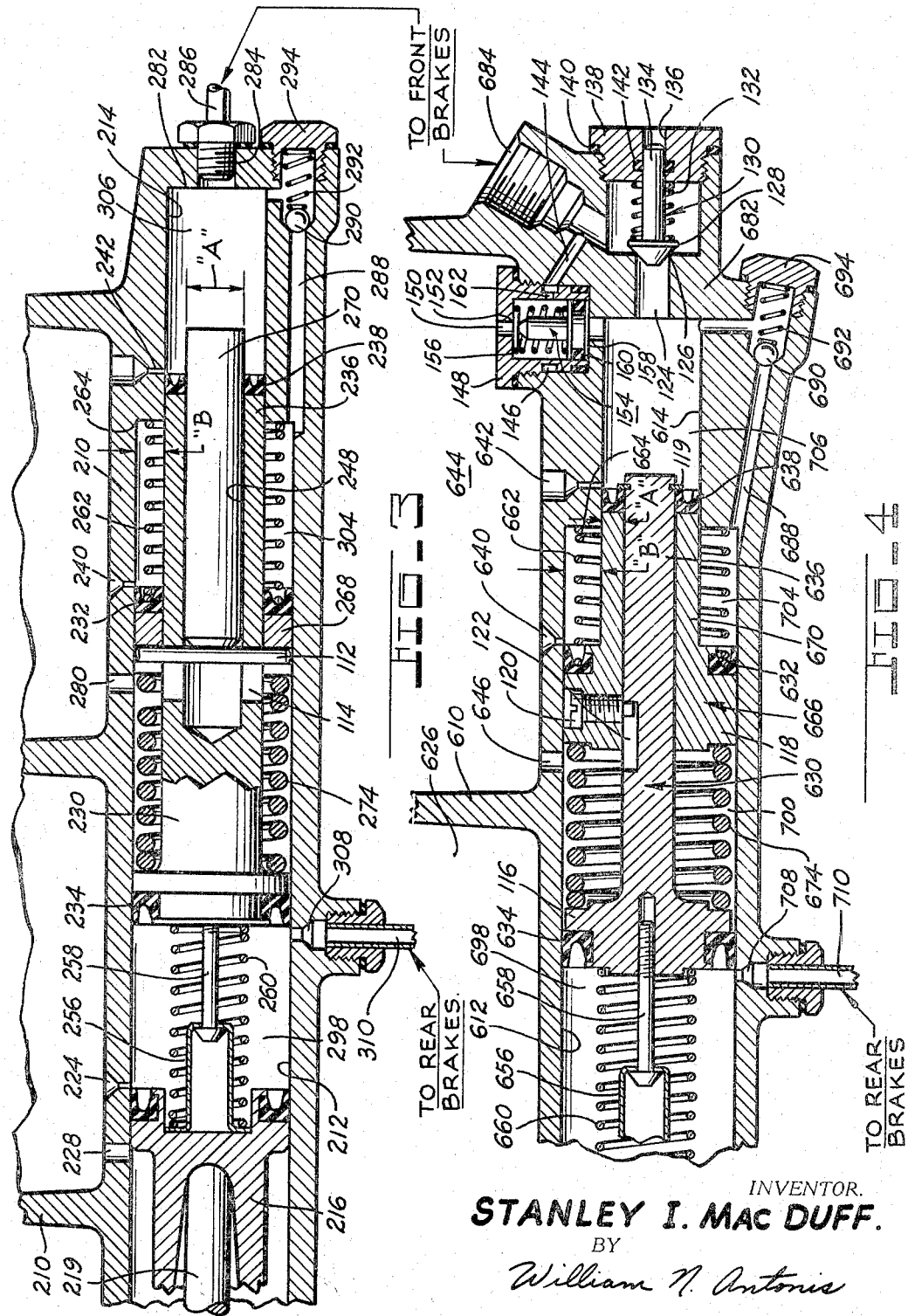

3,312,062
BRAKING SYSTEM FOR VEHICLES
Stanley I. MacDuff, South Bend, Ind., assignor to The Bendix Corporation, South Bend, Ind., a corporation of Delaware
Filed Apr. 30, 1965, Ser. No. 452,241
14 Claims. (Cl. 60—54.6)

This invention relates to a braking system for vehicles and more particularly to a brake proportioning master cylinder for use in such a system.

Because the center of gravity of a vehicle must be a finite distance above the surface upon which the vehicle is traveling, it has long been understood that a weight shift takes place in the direction of travel when the vehicle is decelerated by means of the brakes. In the past, the proportioning of braking between front and rear brakes has been accomplished by providing a fixed ratio of areas in front and rear wheel cylinders which is roughly proportional to the ratio of weight supported by the front wheels to the weight supported by the rear wheels when the vehicle is being decelerated at about .7 g or in the range of 20–25 ft./sec./sec. Obviously, this compromise is not wholly satisfactory, since it provides "optimum" braking at only one road coefficient, and results in premature front wheel slides when the coefficient is less than that for optimum braking, and premature rear wheel slides when the coefficient is greater than that for optimum braking.

Although it can be shown that a curve representing the ideal relationship between front and rear braking effectiveness is not linear in form, present day braking systems provide a relationship which will plot as a straight line with a fixed slope. In attempting to approach the ideal relationship between front and rear braking, earlier inventors have introduced valves, pressure boosters, or deboosters, etc., into the system so that the braking ratio will be changed at one or more points. However, such attempts in many instances have been poor approximations of the desired curve. With these thoughts in mind, it is an object of my invention to provide a closer approximation of the desired curve and to provide means whereby the master cylinder itself is modified to provide such a change in braking ratio for the aforesaid purpose.

In other words, it is an object of the present invention to provide a master cylinder which is adapted to reproportion the relative braking pressures for the front and rear wheels of the vehicle in a manner more closely approximating the ideal or maximum braking efforts for which said wheels are capable without producing premature skidding of either set of wheels.

More specifically, it is an object of this invention to provide a brake proportioning master cylinder which is operable to proportion the braking force of the front and rear wheels of a vehicle in a manner more closely approximating the transfer of weight distribution from the rear to the front wheels produced by deceleration of the vehicle.

To this end, it is another object of this invention to provide a master cylinder having separate hydraulic connections to the front and rear brakes which master cylinder includes mechanism for increasing braking pressure at a higher rate in the front than in the rear after a predetermined braking pressure has been reached at the front wheels. In other words, after a predetermined braking pressure is achieved at the front brakes, the pressures at the front wheels will increase at a proportionally greater rate than at the rear wheels.

A further object of this invention is to provide a brake proportioning master cylinder, the operation of which is perfectly reversible.

A still further object of the present invention is to provide a brake proportioning master cylinder which utilizes a minimum number of parts; is relatively inexpensive to manufacture; is reliable in operation; and is of a sturdy, long lasting construction.

Recently, braking systems have come into use in this country comprising disc front brakes and drum rear brakes. The disc front brakes, in many instances, do not have retracting springs, and, in some instances, may even have light springs which urge the brake pads into contact with the discs. It will be obvious that such brakes will produce retardation with any increase in pressure in the wheel cylinder. On the other hand, conventional drum brakes, which are commonly used on the rear wheels of vehicles, have rather powerful return springs holding the shoes out of contact with the drums in such a manner that pressure must be increased in the wheel cylinder to between 75–100 p.s.i. before the shoes are actually brought into contact with the drum. No effective retardation of the vehicle will occur until such line pressures have been obtained. Under normal braking conditions, this constitutes no handicap in the control of the vehicle, but when the roads are exceedingly slippery, as a result of being covered with packed snow or ice, the tractive coefficient becomes so low that the front wheels will be braked to their sliding point by the disc brakes long before any braking is accomplished with the rear brakes. Since, under these conditions, the rear wheels are supporting from 45 to 50 percent of the vehicle weight, it will be obvious that almost half of the tractive ability or stopping ability of the vehicle is not being utilized. Furthermore, in those situations when braking is increased to the point where the front wheels slide, steering ability will be lost, thereby making it difficult for an unskilled driver to control the vehicle. The only possible advantage that can be attributed to such a system, is that the freely rolling rear wheels protect against skidding by providing positive directional stability. In the past, various types of separate valve devices have been utilized to prevent transmission of system pressure to the front brakes until a pressure in the system has been obtained that will also produce effective braking by the rear brakes. Accordingly, it is another object of this invention to show how such a device, sometimes referred to as a hold off device, may be incorporated directly into a master cylinder of the foregoing type with consequent economy in manufacture and installation.

The above and other objects and features of this invention will become apparent from the following description of the mechanism taken in connection with the accompanying drawings which form a part of this specification and in which:

FIGURE 1 is a longitudinal section of a dual or split system type master cylinder which incorporates my invention;

FIGURE 2 is a graph showing the relationship of front brake pressure to rear brake pressure provided by a master cylinder incorporating the invention;

FIGURE 3 is a partial longitudinal section of a modified form of my invention;

FIGURE 4 is a partial longitudinal section showing still another form of my invention embodying both the front brake pressure boosting system and the pressure hold-off system; and FIGURE 5 is a graph showing the relationship of front brake pressure to rear brake pressure provided by the master cylinder arrangement shown in FIGURE 4.

Referring to FIGURE 1 of the drawings, it will be seen that the master cylinder comprises a housing 10 having an elongated stepped diameter bore which includes a large diameter section 12 and a small diameter section 14. A primary piston 16 is located in the bore adjacent its open end, and in its released position, is maintained in the bore by a snap ring 18. Movement of piston 16 within the bore is achieved through use of the usual foot pedal (not shown) and a push rod 19. The piston 16 is of the usual spool type having a primary or inner sealing cup 20 and a secondary or outer sealing cup 22. A small compensating port 24 is located in front of the lip of cup 20 and communicates with the rear brake fluid reservoir 26. A make-up fluid passage 28 is located to the left of compensating passage 24 so that it is continuously in communication with the reduced diameter portion of the primary piston 16. Also located in the enlarged bore 12 to the right of and spaced from piston 16, is a floating piston 30. The leftward portion of the piston 30 which fits in the enlarged bore 12, is also a spool-like member and is provided with a primary seal 32 and a secondary seal 34, the latter of which is turned backward to seal against pressure generated between the two pistons by movement of piston 16. Piston 30 also has a reduced diameter extension 36 which fits into the reduced diameter portion 14 of the bore. This piston projection 36 is also provided with a primary seal 38. Compensating ports 40 and 42 are located just in front of the primary seals 32 and 38, respectively, and communicate with the front brake reservoir 44. The front and rear brake reservoirs are closed by a suitable cover having fill and vent caps 43 and 45. A make-up fluid passage 47 is located to the left of the compensating port 40 so that it will be in continuous communication with the reduced diameter portion of the floating piston 30.

The piston 30 has a stepped bore extending therethrough, which includes an enlarged section 46 and a reduced section 48. The left end of this bore is closed by a plug 50 which is sealed by an O-ring 52 and secured in place by a snap ring 54.

A metallic cup 56 encloses the head of a screw 58 threaded into the plug 50 and in conjunction therewith constitutes a telescopic mechanism determining the spaced relationship of the two pistons 16 and 30 in their released positions. A spring 60 which surrounds this telescopic mechanism urges the mechanism to its most extended position so that the desired spaced relationship between the pistons in their released positions will be achieved. A spring 62, which is positioned between the right hand base of primary seal 32 and the shoulder 64 between the two bore sections 12 and 14, serves as the return spring urging the complete piston assembly to its most leftward or released position.

A stepped plunger 66 has its larger portion 68 fitted into the larger portion 46 of the stepped bore of piston 30 and its smaller portion 70 fitted into the small diameter portion 48 of the bore in piston 30. Enlarged portion 68 has a rightward facing cup seal 71, while reduced portion 70 has an O-ring 72. A spring 74 urges the stepped plunger to the right until it is stopped by contact with a shoulder 76 formed at the junction of the two bores.

A fluid passage 78 permits communication of the fluid in front of primary seal 32 with the annular, or stepped, face of plunger 66. A fluid passage 80 permits communication between the large bore portion 46 containing the spring 74 and the front brake fluid reservoir 44 via fluid make-up passage 47. The small diameter bore 14 in housing 10 has an integral closed end 82 which contains a threaded passage 84 for receiving conduit 86 leading to the front disc brakes 87.

The portion of the enlarged bore 12 which is to the right of primary seal 32 of floating piston 30 and to the left of shoulder 64, has a passage 88 communicating with the right hand end of the chamber formed by the small diameter bore 14. A check valve 90 held against its seat by a light spring 92 permits communication from the enlarged bore 12 to the small bore 14, but prevents reverse communication. The installation of the check valve 90 is accomplished by means of a threaded plug 94 having a suitable gasket seal.

For convenience in describing the operation of this device, the chamber formed by the reduced diameter section of piston 16 will be designated as chamber 96. The chamber formed between the two pistons and sealed by primary seal 20 and secondary seal 34 will be designated as chamber 98. The chamber formed by the spool like portion of piston 30 will be designated chamber 100. The chamber containing spring 74 will be designated chamber 102. The chamber formed between primary seal 32 and shoulder 64 will be designated 104. The chamber formed in the small diameter portion 14 to the right of primary seal 38 will be designated 106. A fluid passage 108 is located in the side wall of enlarged bore portion 12 just to the left of the released position of secondary seal 34. A conduit 110, which is secured in passage 108, leads to the rear drum brakes 111 of the vehicle.

The operation of the embodiment illustrated in FIGURE 1 and just described above is as follows. When piston 16 is moved to the right, primary seal 20 covers its compensating port 24 and pressure starts to build up in chamber 98. This pressure acting on the left end of floating piston 30 causes it to move to the right. Initial movement of piston 30 causes seals 32 and 38 to cover their compensating ports 40 and 42, respectively. Thereafter, movement of piston 30 will build up pressure in chambers 104 and 106. The necessary displacement from chamber 104 will pass through check valve 90 into chamber 106 thereby continuously equalizing the pressures in these two chambers. Obviously, such movement of pistons 16 and 30 will cause fluid to flow through conduits 110 and 86 in accordance with the needs of the particular brakes which form a part of the system.

Referring to the graph of FIGURE 2, it will be seen that when the master cylinder is operating in the phase just described, the pressures of the front and rear brakes are related as shown in the lower portion of the curve which is marked $a$. At some predetermined pressure, selected so that the resulting curve will most nearly approximate the curve of required pressure which is shown as a heavy dotted line designated $b$, the pressure in chambers 106 and 104 acting upon the areas A plus B, respectively, of the plunger 66 will just equal the installed load of spring 74. Thereafter, increased force on floating piston 30 transmitted thereto through increased pressure in chamber 98, will result in increased pressures in chamber 106. This increased pressure acting on area A of the plunger 66 will result in a greater force acting on the plunger than is exerted by the spring 74. Consequently, plunger 66 will be caused to move to the left in bore 46 and fluid from chamber 104 will flow through passage 78 to occupy the space thus evacuated by the plunger. This flow of fluid results in a reduction in pressure in chamber 104. While operating in this phase, the front to rear brake pressure relationship follows that portion of the curve designated $c$. During this phase, the pressure in chamber 104 will decrease in accordance with the dot-dash line designated $d$. At some predetermined point, in this instance, approximately 600 p.s.i. in the rear brakes and 1200 p.s.i. in the front brakes, the pressure in chamber 104 will have fallen back to zero and the pressure in chamber 106 acting on area A of plunger 66 will be supporting the entire load of spring 74. If pressure on the floating piston 30 is still further increased, pressure in chamber 106 will increase along that portion of the curve marked $f$. It will be seen from the dashed line designated $g$, that portion $f$ of the curve extended will pass through the origin and represents the condition which would have been obtained if all of the force transmitted to the piston 30 had been exerted on the small diameter portion 36 of said piston and utilized to create pressure in chamber 106. It should be understood, however, that the brake system should be designed so that operation will only occur in the area of the section of the curve marked $f$ under conditions of extreme failure due to brake fade or other causes whereby the effectiveness of the brakes might be seriously reduced. It should also be understood that the size of plunger 66 and the maximum stroke thereof, must be designed to be completely out of the operating range, since, if this plunger were permitted to bottom, piston 30 would be hydraulically locked due to pressure in chamber 104 and it would be impossible to further increase the pressure in chamber 106. It should also be obvious that at the moment the pressures in chambers 104 and 106 begin to vary with the pressure in chamber 106 being greater, the check valve 90 will close and remain closed as long as such variation exists. From the foregoing description, it will be apparent to those skilled in the art that the functioning of this unit is completely reversible. That is, any reduction in the force on the floating piston 30 will cause the pressures to decrease along precisely the same path which was followed during the increase.

Referring to FIGURE 3, it will be seen that all like parts, or parts having the same function, are designated by the same numeral plus 200. It will be noted that FIGURE 3 is only a partial longitudinal section in which portions of the master cylinder have been omitted since they are exactly the same as those shown in FIGURE 1. In this embodiment, the functions of floating piston 30 and plunger 66 contained therein in FIGURE 1, are combined in the piston 230 which is shown as a stepped member having an enlarged portion slidable in the enlarged portion 212 of the bore in housing 210. Secondary seal 234 is mounted adjacent the enlarged portion of piston 230 and performs its usual function. An annular ring 268 which surrounds the small diameter portion 236 of piston 230, and is slidable within the enlarged portion 212 of the bore, has a primary seal 232 located against its right face. A pin 112 extends through a cross drilled hole in sleeve 268 and through elongated slots 114 in portion 236 of piston 230. A spring 274 is located between the enlarged portion of piston 230 and the left face of the annular ring 268 for maintaining the ring at the most rightward position permitted by the pin 112 in the slots 114. Reduced diameter portion 236 of piston 230 fits within the small housing bore 214 and is provided with a longitudinal bore 248. A plunger 270 is installed in this bore and is adapted to bear against pin 112 so that pressure acting upon its right end can be exerted through pin 112 against annular ring 268 and therefore against spring 274. Plunger 270 projects beyond the end of the piston portion 236 and primary seal 238 is installed in the groove thus formed. The area of plunger 270 is equivalent to area A of FIGURE 1 and the face area of the annular ring 268 is equivalent to area B of FIGURE 1.

The operation of this version of the invention is exactly the same as that which was previously described. When floating piston 230 is actuated, compensating ports 240 and 242 are first cut off. Thereafter, pressure in chamber 304 and 306 will increase along line $a$ of the FIGURE 2 graph until the pressure in chambers 306 and 304 acting on areas A plus B equals the load of the spring 274. Thereafter, pressure will rise along curve $c$ until the pressure in chamber 306, acting on area A, is capable of supporting the entire spring load. Thereafter, pressure will rise along curve $f$ which is normally outside of the operating range. The length of slot 114 and the compressed length of spring 274 must be related to the fluid requirements of the braking system so that they do not bottom out within any possible operating pressure. It should also be understood that this device will also function in a completely reversible fashion.

In FIGURE 4, corresponding parts and parts having similar functions are designated by the same referenced numerals as are used in FIGURE 1 plus 600. It will be noted that FIGURE 4 is only a partial longitudinal section in which portions of the master cylinder have been omitted since they are exactly the same as those shown in FIGURE 1. In this embodiment, the floating piston 630 is also of the stepped form type which includes an enlarged head 116, slidable in the larger portion 612 of the longitudinal bore of housing 610. The usual backward facing secondary seal 634 is mounted on this enlarged portion of the piston. The piston 630 has a reduced diameter portion 636 which extends to the right. Surrounding this reduced diameter portion 636 is a sleeve type stepped plunger member 666, the larger portion of which 118, fits closely in bore 612. Primary seal 632 is positioned against the shoulder formed by the right-hand face of enlarged plunger portion 118. The reduced portion 670 of plunger 666 extends into, and is slidable in the smaller diameter bore portion 614. In addition, the internal diameter of plunger member 666 is a close sliding fit with reduced diameter portion 636 of piston 630. A primary seal 638 is positioned in an annular recess formed between small diameter bore portion 614 and piston portion 636 to seal the clearances of both of these sliding elements. A snap ring 119 serves to hold this seal in position. The usual compensating ports 640 and 642 are positioned just to the right of the primary seal 632 and 638, respectively. The position of plunger member 666 in relation to piston 630 is determined by a bolt 120 threaded through a lateral bore formed in enlarged portion 118 of plunger member 666, said bolt projecting into a longitudinal slot 122 formed in the side wall of reduced diameter portion 636 of floating piston 630. A heavy spring 674 urges plunger portion 666 to the right so that the bolt 120 engages the right-hand end of slot 122. Spring 674 is installed with a predetermined preload. The usual return spring 662 is installed between shoulder 664 and primary seal 632.

The closed end 682 of the master cylinder housing differs from those previously described in that it has a stepped discharge passage 124 in which the step forms a seat 126 upon which is seated the head 128 of a relief valve 130. A spring 132 urges this relief valve against its seat 126 with a predetermined force. The relief valve 130 is also formed with a stem 134 of a predetermined diameter which extends through a passage 136 formed in a closure plug 138 threaded into the closed end 682 of the master cylinder and sealed by a gasket 140. Stem 134 of valve 130 is also provided with a seal 142 thereby sealing the bore 136. The actual discharge passage 684 which leads to the front disc brakes, is bored at an angle into the end wall 682 of the master cylinder housing so as to intersect the stepped bore 124 to the right of the relief valve. An angular drilled passage 144 leads up towards the front brake reservoir 644 and communicates with an annular groove 146 which surrounds a threaded bushing 148. This bushing is screwed into a passage which is drilled vertically downward from the reservoir 644. The bushing 148 is formed with a stepped bore 150, the shoulder of which forms a seat 152 adapted to receive a valve 154. A spring 156 engages an enlarged piston-like portion 158 of the valve 154, said piston-like portion being fitted into the larger portion of said stepped bore 150 and sealed by an O-ring 160. Fluid from drilled passage 144 and annular groove 146 can enter the interior of bushing 148 through a radially drilled passage 162. When no pressure difference exists across the piston portion 158 of the valve 154, the valve remains off of seat 152 and free communication of fluid will occur between reservoir 644 and brake passage 684. The foregoing hold-off device is more particularly disclosed and claimed in my copending application Ser. No. 449,132.

Referring to FIGURE 5 which shows the pressure relationship between the disc front brakes and the drum rear brakes, it will be seen that the ideal pressure relationship between the front and rear brakes is shown by dash line $b'$ which intercepts the horizontal axis at approximately 100 p.s.i. The purpose of this has been explained previously in relation to the objects of the invention. It will be seen that when the master cylinder of FIGURE 4 is released, temperature compensation can occur from the front brakes to the front brake reservoir 644 through passages 684, 144, and 162, past valve 154 and finally through passage 150 into said reservoir. When the master cylinder is operated and pressure rises in chamber 614, a pressure difference is created across the piston portion 158 of valve 154 which immediately moves said valve to a closed position against the seat 152. However, no flow will take place from chamber 706 until the pressure acting upon the enlarged head 128 of relief valve 130 is sufficient to overcome the force of spring 132. By the proper selection of the spring load and area of seat 126 of the valve 130, flow can be made to occur at the desired 100 p.s.i. level. As a result of this arrangement, the pressure transmitted to the front brakes through passage 684 initially will be 100 p.s.i. less than the pressure existing in chamber 706 or in chamber 698 which is supplying pressurized fluid to the rear brakes. As pressure in chamber 706 increases to some predetermined value which, for purposes of illustration, is shown in FIGURE 5 as being 300 p.s.i., the pressure difference between chamber 706 and fluid passage 684 will steadily reduce because the pressure in passage 684 acts on the area of valve stem 142 to take over a portion of the load of spring 132, which load originally was supported only by pressure on the face of valve head 128. At the predetermined 300 p.s.i. level, the area of the valve stem 134 is designed to be large enough to support the entire spring load, thereby causing valve 130 to remain continuously off of its seat 126 as long as the pressure in chamber 706 equals or exceeds 300 p.s.i. This same 300 p.s.i. level has been selected as the point at which the pressures in chambers 706 and 704, which have been equal up to this level, exert sufficient pressure upon areas A plus B (the total face area of plunger member 666) to overcome the force of spring 674. If pressure is further increased by increasing the actuating force on the master cylinder, the pressure in chamber 706 will now rise on that portion of the curve which is designated $c'$ until a point is reached where the pressure in chamber 706 acting on area A alone is sufficient to support the load of the spring 674. Again, for purposes of illustration, this point is shown in FIGURE 5 as being at approximately 800 p.s.i. front brake pressure and 500 p.s.i. rear brake pressure. As in the case of the previously described embodiments, if sufficient force is applied to actuate the master cylinder to a pressure in excess of the 500–800 point, the brake pressure will increase along $f'$.

The function of this system will be completely reversible in the portions of the curce $c'$ and $f'$ but will only be reversible in the area of the curve $a''$ if the ratio of the piston area of valve 154, which receives the pressure of chamber 614 to the valve seat area, is designed exactly equal to the ratio of the plunger 134 area to seat area of valve 130 and the spring loads are exactly proportioned to the relative areas of the two valves. In the example used, the ratio for the valves must be 3:1 and, as a further example, the area of valve head 128 might be ¼ sq. in. (approximately 9/16" diameter) whereupon the area of valve stem 134 would have to be 1/12 sq. in. (about 21/64" diameter) and the load of the spring 132 would be 25 lbs. in order to provide initial valve opening at 100 p.s.i. It is obvious that when pressure in passage 684 reaches 300 p.s.i. the force on the valve stem 134 equals the 25 lbs. spring load. As a practical matter, in order to insure that valve 154 will always function ahead of valve 130 and thereby prevent loss of fluid into the reservoir and consequent failure to actuate the front brakes, it is necessary to design the load of spring 156 somewhat less than its due proportion in relation to the spring 132. For example, the spring 150 might be made of such load that it would permit valve 154 to close at 80 p.s.i. if valve 130 is designed to open at 100 p.s.i. The actual result of this will be that when the master cylinder is being operated in a pressure reducing phase and it reaches the point (300, 300) instead of falling immediately along the curve $a''$ upon which it rose, front brake pressure will remain at the level of 300 p.s.i. while rear brake pressure falls 20 p.s.i. and the front brake pressure will thereafter fall along the line which I have designated $a'''$ intercepting the horizontal axis at 80 p.s.i. It will be obvious that this small deviation from reversibility should not be seriously detrimental to the operating characteristics of the vehicle and, in actual fact, should be hardly detectable by the driver.

The several practical advantages which flow from any novel inventive arrangements are believed to be obvious from the above description and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, I do not desire to be limited to the specific embodiments disclosed herein primarily for purposes of illustration, but instead, desire protection falling within the scope of the appended claims.

Having thus described the various features of the invention, what I claim as new and desire to secure by Letters Patent is:

1. In a braking system for a vehicle having a set of front brakes and a set of rear brakes, a fluid pressure generating device comprising a housing having a bore therein and fluid reservoir means communicating with said bore, said bore having a small diameter section and a large diameter section, a first piston member located in said bore and having a small diameter portion and a large diameter portion operable in said small diameter and large diameter bore sections, respectively, said small diameter piston portion forming a first pressure chamber with one end of said small diameter bore section and said large diameter piston portion forming a second pressure chamber with one end of said large diameter bore section and said small diameter piston portion, first passage means for communicating said first chamber with said front set of brakes, second passage means for communicating said second chamber with said first chamber, a second piston member located in said bore and operable in the end of said large diameter bore section opposite said small diameter bore section, said second piston member forming with said first piston member a third pressure chamber in said bore, third passage means for communicating said third chamber with said rear set of brakes, means located in said second passage means for permitting fluid to be displaced from said second chamber to said first chamber upon movement of said first piston member but preventing reverse flow of fluid from said first chamber to said second chamber, said first and second chambers having equal pressures therein during such fluid displacement, means for applying a force to said second piston member to cause actuation thereof, fluid in said third chamber for transmitting such force from said second piston member to said first piston member to cause simultaneous actuation of both piston members and displacement of fluid from said chambers to said brakes, plunger means for providing a higher rate of pressure increase in said front set of brakes at first chamber pressures above a predetermined value, said plunger means having first and second face areas, the first of which is exposed to the pressure in said first chamber for urging said plunger means in one direction and the second of which is exposed to the pressure in said second chamber for urging said plunger means in the same direction, and preloaded spring means for urging said plunger means in the opposite direction and preventing movement thereof at first chamber pressures below said predetermined value, said plunger means being operatively connected to said first piston member and movable relative thereto at first chamber pressures above said predetermined value to thereby progressively reduce the fluid pressure in said second chamber below said predetermined value and prevent displacement of fluid therefrom to said first chamber by increasing the effective volume of said second chamber.

2. A system, as defined in claim 1, wherein the means located in said second passage means comprises a check valve.

3. A system, as defined in claim 1, wherein said first piston member includes a bore having a small diameter section and a large diameter section and passage means for communicating said large diameter section of said piston bore with said second chamber, and said plunger means comprises a stepped diameter member the small diameter portion of which is located in the small diameter section of said piston bore and contains said first face area and the large diameter portion of which is located in the large diameter section of said piston bore and contains said second face area.

4. A system, as defined in claim 3, wherein said preloaded spring means comprises a coil spring which is located in the large diameter section of said piston bore and is confined between one end of said piston bore and the large diameter portion of said stepped diameter member.

5. A system, as defined in claim 1, wherein said first piston member includes a bore therein, and said plunger means comprises a cylindrical member located in said piston bore, said cylindrical member having said first face area formed thereon, a ring-like member surrounding the small diameter portion of said first piston member and located in the large diameter section of said housing bore, said ring-like member having said second face area formed thereon, and means for operatively connecting said cylindrical member with said ring-like member and permitting concomitant movement of both members with respect to said first piston member.

6. A system, as defined in claim 5, wherein said last mentioned means includes a pair of diametrically opposed elongated slots in the wall of said first piston member and a pin extending through said slots, said pin being rigidly connected to said ring-like member and in abutment with said cylindrical member.

7. A system, as defined in claim 5, wherein said preloaded spring means comprises a coil spring which is located in the large diameter section of said housing bore and is confined between the large diameter portion of said first piston member and said ring-like member.

8. A system, as defined in claim 1, wherein said plunger means comprises a stepped diameter sleeve-like member surrounding the small diameter portion of said first piston member, said small diameter portion of said sleeve-like member being located in the small diameter section of said housing bore and having said first face area formed thereon, and said large diameter portion of said sleeve-like member being located in the large diameter section of said housing bore and having said second face area formed thereon.

9. A system, as defined in claim 8, wherein said preloaded spring means comprises a coil spring which is located in the large diameter section of said housing bore and is confined between the large diameter portion of said first piston member and the large diameter portion of said stepped diameter sleeve-like member.

10. A system, as defined in claim 1, wherein said front brakes are of the disc type and rear brakes are of the drum type, which includes pressure responsive valve means located in said first passage means for permitting fluid flow from said first chamber to said front disc brakes only at first chamber pressures above a second predetermined value.

11. In a braking system for a vehicle having a set of front brakes and a set of rear brakes, a fluid pressure generating device comprising a housing having a bore therein and fluid reservoir means communicating with said bore, a first piston member located in said bore and forming first and second pressure chambers in said bore, said first piston member having a first effective area for generating pressures in said first chamber and a second effective area for generating pressures in said second chamber, first passage means for communicating said first chamber with said front set of brakes, second passage means for communicating said second chamber with said first chamber, a second piston member located in said bore and forming with said first member a third pressure chamber in said bore, third passage means for communicating said third chamber with said rear set of brakes, means located in said second passage means for permitting fluid to be displaced from said second chamber to said first chamber upon movement of said first piston member but preventing reverse flow of fluid from said first chamber to said second chamber, said first and second chambers having equal pressures therein during such fluid dispacement, means for applying a force to said second piston member to cause actuation thereof, fluid in said third chamber for transmitting such force from said second piston member to said first piston member to cause simultaneous actuation of both piston members and displacement of fluid from said chambers to said brakes, plunger means for providing a higher rate of pressure increase in said front set of brakes at first chamber pressures above a predetermined value, said plunger means being operatively connected to said first piston member and being movably responsive to the pressures in said first and second chambers to thereby progressively reduce the fluid pressure in said second chamber and prevent displacement of fluid therefrom to said first chamber at first chamber pressures above said predetermined value, and preloaded spring means operatively connected to said plunger means for preventing movement thereof at first chamber pressures below said predetermined value.

12. In a braking system for a vehicle having a set of front brakes and a set of rear brakes, a fluid pressure generating device comprising a housing having first, second and third pressure chambers therein and fluid reservoir means communicating with said chambers, first passage means for communicating said first chamber with said front set of brakes, second passage means for communicating said second chamber with said first chamber, third passage means for communicating said third chamber with said rear set of brakes, a first movable member for generating pressures in said first and second chambers to displace fluid into said front set of brakes, a second movable member for generating pressures in said third chamber to displace fluid into said rear set of brakes, means located in said second passage means for permitting fluid to be displaced from said second chamber to said first chamber upon movement of said first movable member but preventing reverse flow of fluid from said first chamber to said second chamber, said first and second chambers having equal pressures therein during such displacement, means for applying a force to one of said movable members to cause actuation thereof, fluid in said system for transmitting such force from said one movable member to the other movable member to cause simultaneous actuation of both members, said first movable member having a first effective area for generating pressures in said first chamber and a second effective area for generating pressures in said second chamber and means for providing a higher rate of pressure increase in said front set of brakes at first chamber pressures above a predetermined value, said last mentioned means being operatively connected to said first movable member and being responsive to the pressures in said first and second chambers to thereby progressively reduce the fluid pressure in said second chamber and prevent displacement of fluid therefrom to said first chamber at first chamber pressures above said predetermined value.

13. In a braking system for a vehicle having a set of front brakes and a set of rear brakes, a fluid pressure generating device comprising a housing having a plurality of pressure chambers each of which is connected to one set of brakes, movable members for generating pressures in the respective chambers to displace fluid into said set of brakes, means for applying a force to one of said movable members to cause actuation thereof, fluid in said system for transmitting such force between said movable members to simultaneously cause actuation thereof upon actuation of said one movable member, and means for providing a higher rate of pressure increase in said front set of brakes at chamber pressures above a predetermined value, said last mentioned means being operatively connected to the movable member generating pressures for displacement of fluid into said front set of brakes and being responsive to the pressures in the chambers containing fluid for displacement to said front set of brakes.

14. In a braking system for a vehicle having a set of front brakes and a set of rear brakes, a fluid pressure generating device comprising a housing having first and second chamber means and fluid reservoir means communicating with said chamber means, first passage means for communicating said first chamber means with said front set of brakes, second passage means for communicating said second chamber means with said rear set of brakes, a first movable member for generating pressures in said first chamber means to displace fluid into said front set of brakes, a second movable member for generating pressures in said second chamber means to displace fluid into said rear set of brakes, means for applying a force to one of said movable members to cause actuation thereof, fluid in said system for transmitting such force from said one movable member to the other movable member to cause simultaneous actuation of both members, said first movable member having means for providing a higher rate of pressure increase in said front set of brakes at first chamber means pressures above a predetermined value, said last mentioned means being operatively connected to said first movable member and being responsive to the pressures in said first chamber means.

References Cited by the Examiner

UNITED STATES PATENTS 1,621,912   3/1927   Van Derwyk _____ 60—54.5

MARTIN P. SCHWADRON, *Primary Examiner.*

ROBERT R. BUNEVICH, *Examiner.*